United States Patent
Toda

(10) Patent No.: US 6,509,831 B1
(45) Date of Patent: Jan. 21, 2003

(54) COUPLER FOR DIGITAL COMMUNICATION ON ELECTRIC POWER-LINES

(76) Inventor: Kohji Toda, 1-49-18 Futaba, Yokosuka (JP), 239-0814

( * ) Notice: Subject to any disclaimer, the term of this patent is extended or adjusted under 35 U.S.C. 154(b) by 304 days.

(21) Appl. No.: 09/666,003

(22) Filed: Sep. 19, 2000

(51) Int. Cl.$^7$ ............................................... H04M 11/04
(52) U.S. Cl. ........................ 340/310.01; 340/310.02; 340/310.07; 340/310.08; 375/220
(58) Field of Search ...................... 340/310.01, 310.02, 340/310.08, 310.07; 375/220

(56) References Cited

U.S. PATENT DOCUMENTS

| | | | | |
|---|---|---|---|---|
| 4,408,186 A | * | 10/1983 | Howell | 340/310.01 |
| 4,642,607 A | * | 2/1987 | Strom et al. | 310/71 |
| 4,675,648 A | * | 6/1987 | Roth et al. | 340/310.07 |
| 5,497,142 A | * | 3/1996 | Chaffanjon | 340/310.06 |
| 6,154,488 A | * | 11/2000 | Hunt | 375/219 |

* cited by examiner

*Primary Examiner*—Julie Lieu

(57) ABSTRACT

A coupler for digital communication on electric power-lines comprises an input connector connected with first electric power-lines, an output connector connected with second electric power-lines, and a transmitting device, which is connected between the input connector and the output connector, and stands in parallel with a transformer between the first electric power-lines and the second electric power-lines. The transmitting device consists of a piezoelectric substrate, a tuning coil, a first intermediary IDT, a first coded IDT, a second coded IDT, a third coded IDT, a fourth coded IDT, a second intermediary IDT, an electrode group, a synchronizing device, an envelope detecting device, and a pulse generator. If a coded message digital-signal is received at the input connector from the first electric power-lines, the coded message digital-signal arrives at the first intermediary IDT via the tuning coil. The message digital-signal is, last of all, transduced to a coded output digital-signal at the pulse generator, and is delivered into the second electric power-lines via the output connector.

9 Claims, 3 Drawing Sheets

COUPLER FOR DIGITAL COMMUNICATION ON ELECTRIC POWER-LINES

BACKGROUND OF THE INVENTION

1. Field of the Invention

The present invention relates to a coupler used in a transformer section of electric power-lines for digital network communication by means of using a transmitting device, which includes a piezoelectric substrate and four coded interdigital transducers (IDTs).

2. Description of the Prior Art

Electric power-lines are greatly desired to be used for digital network communication. However, the existence of power line transformer, where an electric power-line is separated under high-frequency condition but is not separated electro-magnetically, makes signal transmission difficult. Thus, in order to use the electric power-lines, a coupler, which connects two separated electric power-lines, is necessary. A conventional type of transformer for high-frequency signal transmission employs coils. However, the use of coil causes an electromagnetic coupling. In short, it is difficult for the conventional type of transformer to prevent the influence of noises. In addition, the conventional type of transformer has a problem on transmitting ability because the use of digital pulse-signal is indispensable for digital network communication.

SUMMARY OF THE INVENTION

An object of the present invention is to provide a coupler for digital communication on electric power-lines comprising an input connector, an output connector, and a transmitting device.

Another object of the present invention is to provide a coupler for digital communication on electric power-lines capable of transmitting a message-digital signal over a power line transformer without the influence of noises.

Another object of the present invention is to provide a coupler for digital communication on electric power-lines excellent in transmitting ability.

Another object of the present invention is to provide a coupler for digital communication on electric power-lines capable of a low electric power consumption.

Another object of the present invention is to provide a coupler for digital communication on electric power-lines excellent in durability and manufacturing.

A still other object of the present invention is to provide a coupler for digital communication on electric power-lines having a small size which is very light in weight and has a simple structure.

According to one aspect of the present invention there is provided a coupler for digital communication on electric power-lines comprising an input connector connected with first electric power-lines, an output connector connected with second electric power-lines, and a transmitting device, which is connected between the input connector and the output connector, and is located in parallel with a transformer between the first electric power-lines and the second electric power-lines. If a coded message digital-signal is received at the input connector from the first electric power-lines, the coded message digital-signal is tansduced to a coded output digital-signal by the transmitting device. Thus, the coded output digital-signal is delivered from the output connector into the second electric power-lines.

According to another aspect of the present invention there are provided a mixer as the output connector and a transmitting device, which consists of a piezoelectric substrate, a tuning coil, a first intermediary IDT, first-, second-, third-, and fourth coded IDTs, a second intermediary IDT, an electrode group, a synchronizing device, an envelope detecting device, and a pulse generator. The first-, second-, third-, and fourth coded IDTs consist of at least three interdigital electrode pairs, respectively, and have first-, second-, third-, and fourth coded patterns, respectively. The electrode group consists of two sideward IDTs and a central IDT between the sideward IDTs. The synchronizing device is connected between the first intermediary IDT and one of the sideward IDTs. The envelope detecting device is connected with the central IDT. The pulse generator is connected with the envelope detecting device.

If a message digital-signal is received at the input connector from the first electric power-lines, the message digital-signal is applied to the first intermediary IDT via the tuning coil. In this time, if the message digital-signal is composed of a row of pulse-groups, of which each is composed of a coded row of pulses, a first surface acoustic wave (SAW) composed of a coded row of burst-waves is excited on the piezoelectric substrate. When the first SAW corresponds to the first coded pattern, a first decoded pulse is detected at the first coded IDT. In the same way, when the first SAW corresponds to the second coded pattern, a second decoded pulse is detected at he second coded IDT. The first- and second decoded pulses are applied to the third coded IDT and the fourth coded IDT, respectively. In this time, second- and third SAWs corresponding to the third- and fourth coded patterns, respectively, are excited on the piezoelectric substrate. And then, a coded burst-signal corresponding to the second- and third SAWs, respectively, is detected at the second intermediary IDT. When the coded burst-signal arrives at the two sideward IDTs simultaneously, fourth- and fifth SAWs are excited on the piezoelectric substrate, respectively. The fourth- and fifth SAWs arrive at the central IDT simultaneously. And the coded digital-signal corresponding to the third- and fourth coded patterns, respectively, is obtained at the envelope detecting device. Thus, an output digital-signal, which is based on the coded digital-signal and is equivalent to the message digital-signal, is generated at the pulse generator. And then, the output digital-signal is delivered via the mixer into the second electric power-lines.

According to another aspect of the present invention there is provided a coupler for digital communication on electric power-lines, wherein a propagation direction of the first SAW is orthogonal to that of the second- and third SAWs.

According to another aspect of the present invention there is provided a coupler for digital communication on electric power-lines, wherein a propagation direction of the second- and third SAWs is orthogonal to that of the fourth- and fifth SAWs.

According to another aspect of the present invention there are provided first- and second coded IDTs having a different number of interdigital electrode pairs from third- and fourth coded IDTs, respectively.

According to another aspect of the present invention there are provided third- and fourth coded patterns in reverse to first- and second coded patterns, respectively.

According to another aspect of the present invention there are provided first-, second-, third-, and fourth coded patterns changed in accordance with a designated time region, respectively.

According to other aspect of the present invention there is provided a piezoelectric substrate made of a piezoelectric ceramic, the polarization axis thereof being parallel to the thickness direction thereof.

According to a further aspect of the present invention there is provided a bipolar-pulse generator in place of the pulse generator.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
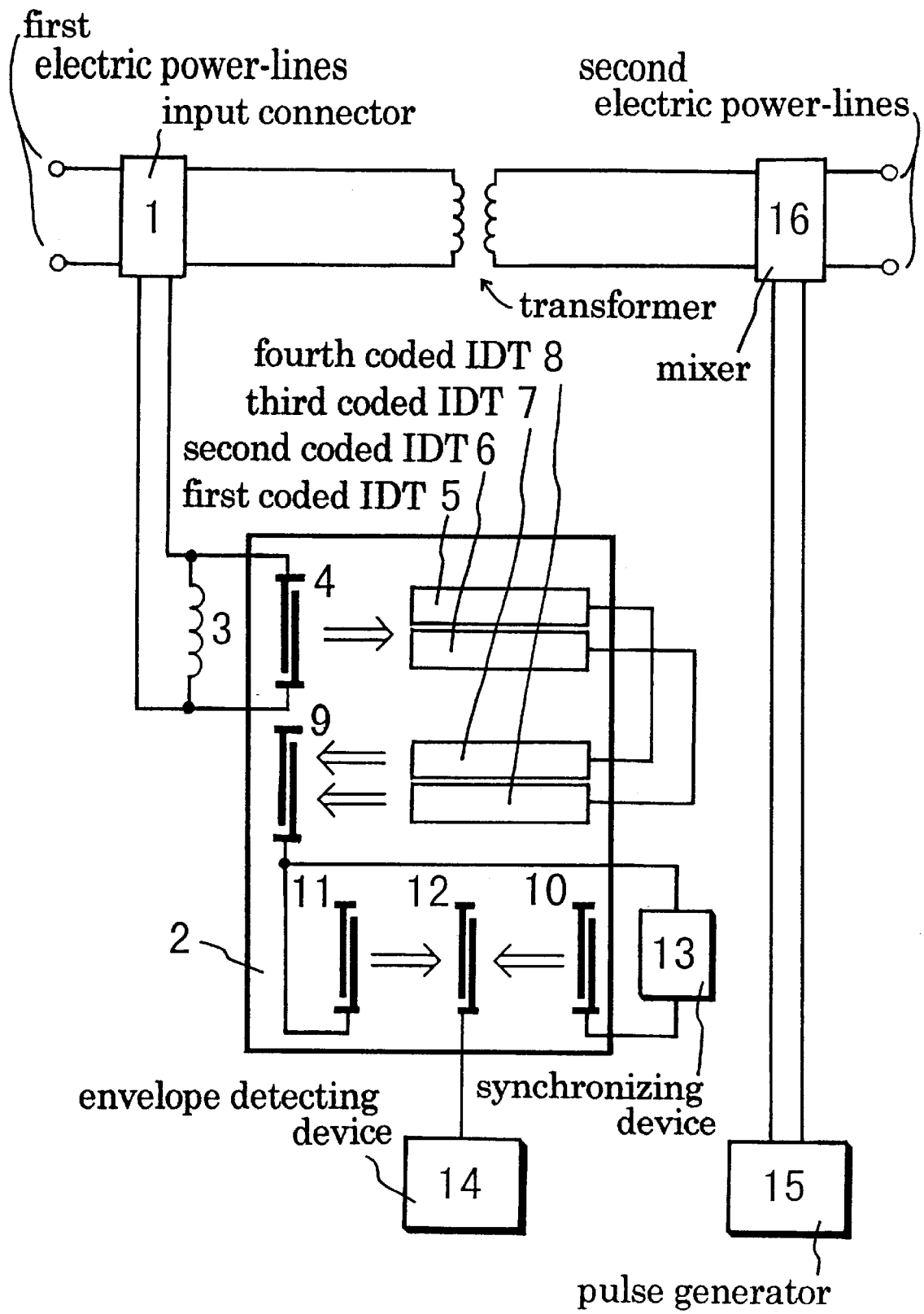
FIG. 1 shows a schematic illustration of a coupler for digital communication on electric power-lines according to an embodiment of the present invention.

FIG. 1 shows a schematic illustration of a coupler for digital communication on electric power-lines according to an embodiment of the present invention. The coupler for digital communication on electric powerlines comprises input connector 1, mixer 16 as an output connector, and a transmitting device. Input connector 1 is connected with first electric powerlines. Mixer 16 is connected with second electric power-lines. The transmitting device comprises piezoelectric substrate 2, tuning coil 3, first intermediary IDT 4, first coded IDT 5, second coded IDT 6, third coded IDT 7, fourth coded IDT 8, second intermediary IDT 9, sideward IDT 10, sideward IDT 11, central IDT 12, synchronizing device 13, envelope detecting device 14, and pulse generator 15. The transmitting device is connected between input connector 1 and mixer 16, and is located in parallel with a transformer between the first electric powerlines and the second electric power-lines. Sideward IDT 10, sideward IDT 11, and central IDT 12 form an electrode group. Synchronizing device 13 is connected between second intermediary IDT 9 and sideward IDT 10. Envelope detecting device 14 is connected with central IDT 12. Pulse generator 15 is connected with envelope detecting device 14. Piezoelectric substrate 2 is made of a piezoelectric ceramic plate with a dimension of 200 $\mu$m in thickness, and the polarization axis thereof is parallel to the thickness direction thereof. First intermediary IDT 4, first coded IDT 5, second coded IDT 6, third coded IDT 7, fourth coded IDT 8, second intermediary IDT 9, sideward IDT 10, sideward IDT 11, and central IDT 12, made of an aluminum thin film, respectively, are formed on piezoelectric substrate 2. First intermediary IDT 4, second intermediary IDT 9, sideward IDT 10, sideward IDT 11, and central IDT 12 have an interdigital periodicity of 40 $\mu$m, respectively. Thus, the coupler for digital communication on electric power-lines has a simple structure with s small size.

Figure 2:
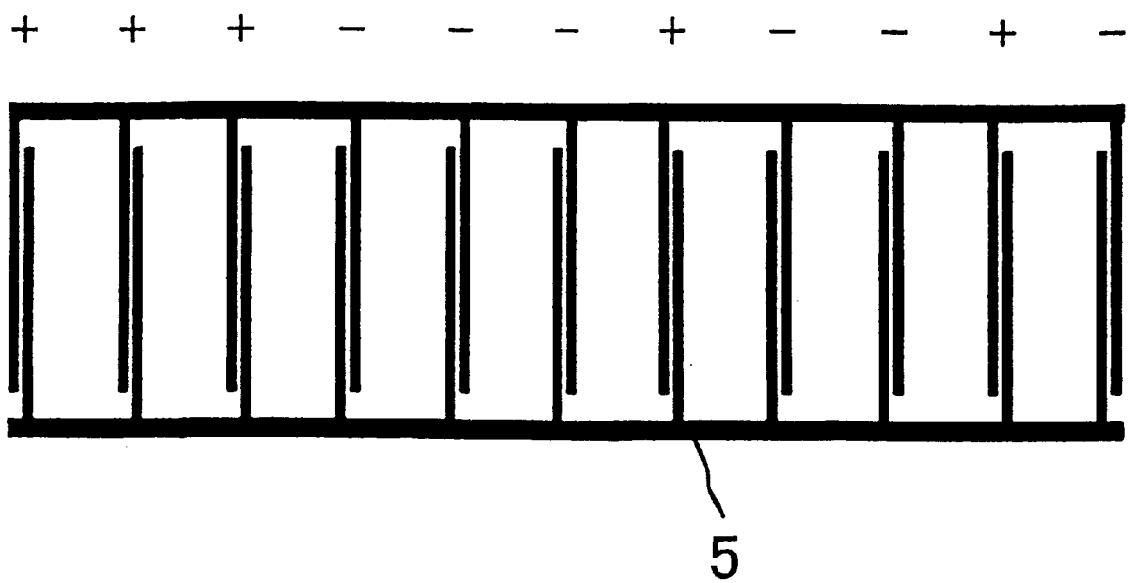
FIG. 2 shows a plan view of first coded IDT 5.

FIG. 2 shows a plan view of first coded IDT 5, which consists of eleven interdigital electrode pairs. Each pair has an interdigital periodicity of 40 $\mu$m. First coded IDT 5 has a first coded pattern based on the Baker code. Second coded IDT 6 also consists of eleven interdigital electrode pairs, and has a second coded pattern different from first coded IDT 5.

Third coded IDT 7 has a third coded pattern in reverse to the first coded pattern. Fourth coded IDT 8 has a fourth coded pattern in reverse to the second coded pattern. Besides an eleven-digits code (1, 1, 1, 0, 0, 0, 1, 0, 0, 1, 0) as shown in FIG. 2, for example, a three-digits code (1, 1, 0), a seven-digits code (1, 1, 1, 0, 0, 1, 0), and others are available.

In the coupler for digital communication on electric power-lines in FIG. 1, if a message digital-signal is received at input connector 1 from the first electric power-lines, the message digital-signal arrives, via tuning coil 3 used for impedance matching, at first intermediary IDT 4. In this time, if the message digital-signal is composed of a row of pulse-groups, of which each is composed of a coded row of eleven pulses, a first SAW composed of a coded row of eleven burst-waves is excited on piezoelectric substrate 2. When the coded row of eleven burst-waves corresponds to the first coded pattern, a first decoded pulse is detected at first coded IDT 5. In the same way, when the coded row of eleven burst-waves corresponds to the second coded pattern, a second decoded pulse is detected at second coded IDT 6. Thus, both first coded IDT 5 and second coded IDT 6 have an ability as a SAW matched filter. The first- and second decoded pulses are applied to third coded IDT 7 and fourth coded IDT 8, respectively. In this time, second- and third SAWs corresponding to the third- and fourth coded patterns, respectively, are excited on piezoelectric substrate 2. Because third coded IDT 7 and fourth coded IDT 8 have eleven interdigital electrode pairs, respectively, a coded burst-signal, that is, a coded row of eleven bursts is detected at second intermediary IDT 9. The use of first coded IDT 5, second coded IDT 6, third coded IDT 7, and fourth coded IDT 8 enables the message digital-signal to be refined, in short, makes a contribution to the elimination of noises. The coded burst-signal arrives at sideward IDT 10 and sideward IDT 11, simultaneously, and then, fourth- and fifth SAWs are excited on piezoelectric substrate 2, respectively. Because synchronizing device 13 is arranged between second intermediary IDT 9 and sideward IDT 10, and in addition, envelope detecting device 14 is connected with central IDT 12, a coded digital-signal, that is, a coded row of eleven digital-pulses, is obtained at envelope detecting device 14. The synchronizing device 13, consisting of a full wave rectifier and a monostable multivibrator, is for the provision of timing information. It is noted that the polarity of the dc pulse signal obtained for synchronization is independent of the phase polarity of the transmitting signal. Thus, an output digital-signal, which is based on the coded digital-signal and is equivalent to the message digital-signal, is generated at pulse generator 15. And then, the output digital-signal is delivered via mixer 16 into the second electric power-lines. As a result, it is possible to transmit the message-digital signal over the transformer without the influence of noises. Moreover, the coupler for digital communication on electric power-lines is excellent in transmitting ability. In addition, the incorporation of the coded IDTs in the coupler for digital communication on electric power-lines is characterized as follows: (a) real time synchronization, (b) simple system construction.

Figure 3:
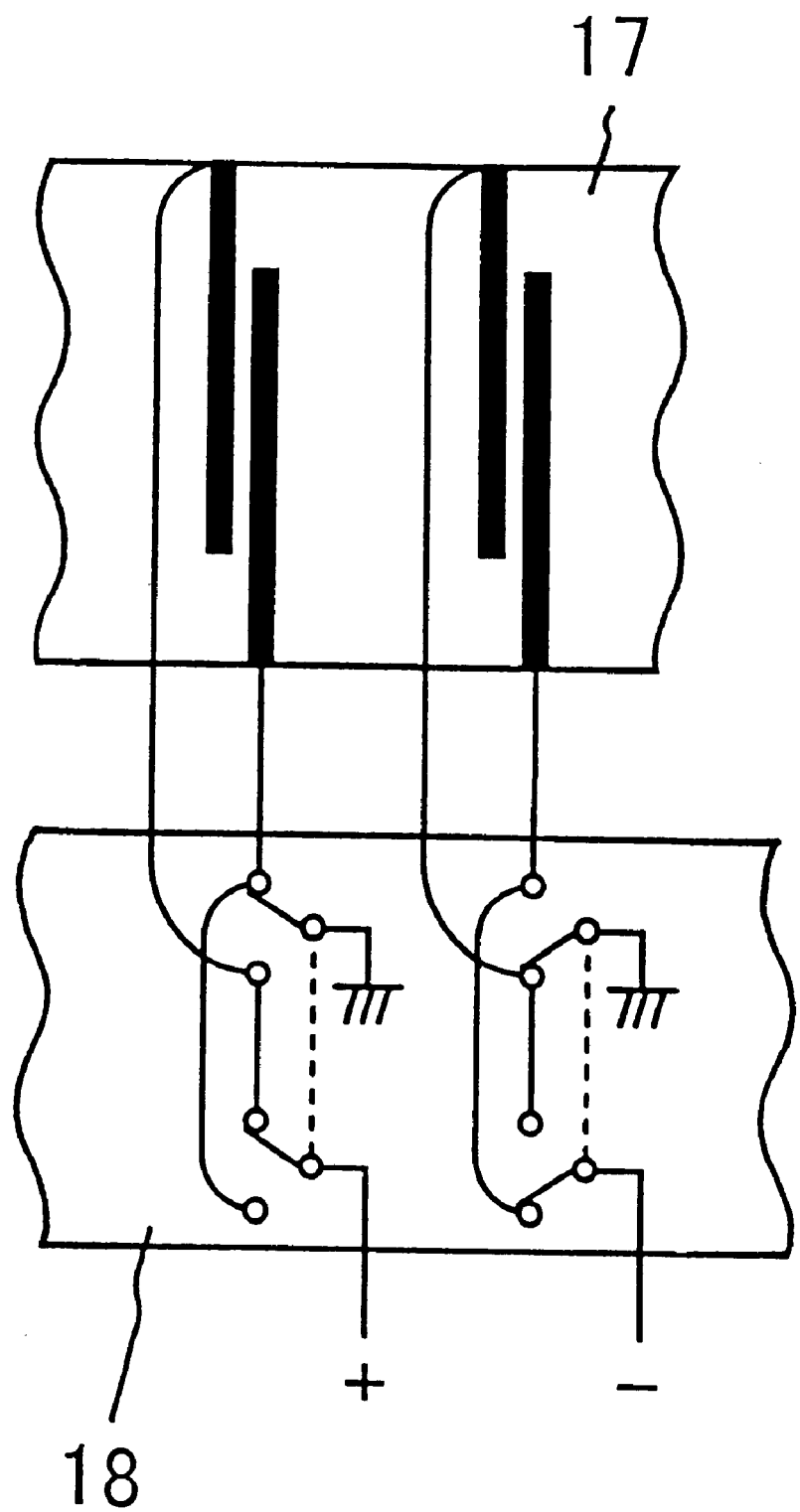
FIG. 3 shows a fragmentary plan view of another coded IDT 17 which is used in place of first coded IDT 5, second coded IDT 6, third coded IDT 7, and fourth coded IDT 8, respectively.

FIG. 3 shows a fragmentary plan view of another coded IDT 17 which is used in place of first coded IDT 5, second coded IDT 6, third coded IDT 7, and fourth coded IDT 8, respectively. Coded IDT 17 consists of eleven interdigital electrode pairs. Each pair has an interdigital periodicity of 40 $\mu$m. Coded IDT 17 has a coded pattern, which is changed in accordance with a designated time region by using switch 18. Thus, coded IDT 17 that incorporates switch 18 realizes the same function as first coded IDT 5, second coded IDT 6, third coded IDT 7, and fourth coded IDT 8.

In the coupler for digital communication on electric power-lines in FIG. 1, the third- and fourth coded patterns are in reverse to the first- and second coded patterns, respectively. Therefore, the output digital-signal equivalent to the message digital-signal is delivered via mixer 16. However, another construction that third- and fourth coded patterns have no relation to first- and second coded patterns, is available. Such a construction causes the output digital-signal, which has another coded pattern from the message digital-signal. In other words, it is possible to keep the output digital-signal under secret condition.

In the coupler for digital communication on electric power-lines in FIG. 1, all the coded IDTs have the same number of interdigital electrode pairs. However, another construction that first coded IDT 5 and second coded IDT 6 have a different number of interdigital electrode pairs from third coded IDT 7 and fourth coded IDT 8, is available. Such a construction causes the output digital-signal, which has another coded pattern from the message digital-signal. Therefore, it is possible to keep the output digital-signal under secret condition.

In the coupler for digital communication on electric power-lines in FIG. 1, a propagation direction of the first SAW is parallel to that of the second- and third SAWs. However, it is possible to arrange third coded IDT 7 and fourth coded IDT 8 in order that the propagation direction of the first SAW is orthogonal to that of the second- and third SAWs. In addition, a propagation direction of the second- and third SAWs is parallel to that of the fourth- and fifth SAWs, in FIG. 1. However, it is possible to arrange sideward IDT 10, sideward IDT 11, and central IDT 12 in order that the propagation direction of the second- and third SAWs is orthogonal to that of the fourth- and fifth SAWs.

In the coupler for digital communication on electric power-lines, in FIG. 1, the message digital-signal is composed of the row of pulse-groups, of which each is composed of the coded row of eleven pulses. Therefore, the output digital-signal equivalent to the message digital-signal is generated at pulse generator 15 after all. However, if each pulse-group in the message digital signal is composed of a coded row of eleven bipolar-pulses, bipolar-pulse generator 19 is used in place of pulse generator 15 in order to detect an output digital-signal equivalent to the message digital-signal. As a result, a coded digital-signal is obtained at envelope detecting device 14, and the output digital-signal based on the coded digital-signal is generated at bipolar-pulse generator 19. The output digital-signal is delivered via mixer 16 into the second electric power-lines. Accordingly, the use of bipolar-pulse generator 19 enables a transmission excellent in transmitting ability on electric power-lines.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A coupler for digital communication on electric power-lines comprising:
    an input connector connected with first electric power-lines;
    an output connector connected with second electric power-lines; and
    a transmitting device connected between said input connector and said output connector, and located in parallel with a transformer between said first electric power-lines and said second electric power-lines,
    said input connector receiving a coded message digital-signal from said first electric power-lines,
    said transmitting device transducing said coded message digital-signal to a coded output digital-signal,
    said output connector delivering said coded output digital-signal into said second electric power-lines.

2. A coupler for digital communication on electric power-lines comprising:
    an input connector connected with first electric power-lines;
    a mixer as an output connector connected with second electric power-lines; and
    a transmitting device consisting of
        a piezoelectric substrate,
        a tuning coil,
        a first intermediary IDT,
        a first coded IDT,
        a second coded IDT,
        a third coded IDT,
        a fourth coded IDT, said first-, second-, third-, and fourth coded IDTs consisting of at least three interdigital electrode pairs, respectively, and having first-, second-, third-, and fourth coded patterns, respectively,
        a second intermediary IDT,
        an electrode group consisting of two sideward IDTs and a central IDT between said sideward IDTs,
        a synchronizing device connected between said first intermediary IDT and one of said sideward IDTs,
        an envelope detecting device connected with said central IDT, and
        a pulse generator connected with said envelope detecting device,
    said transmitting device being connected between said input connector and said output connector, and located in parallel with a transformer between said first electric power-lines and said second electric power-lines,
    said input connector receiving a message digital-signal from said first electric power-lines, said message digital-signal being composed of a row of pulse-groups, of which each is composed of a coded row of pulses,
    said first intermediary IDT exciting a first SAW on said piezoelectric substrate, when receiving said coded row of pulses via said tuning coil,
    said first- and second coded IDTs detecting first- and second decoded pulses, respectively, if said first SAW corresponds to said first- and second coded pattern, respectively,
    said third- and fourth coded IDTs exciting second- and third SAWs, respectively, on said piezoelectric substrate when receiving said first- and second decoded pulses, respectively,
    said second intermediary IDT detecting a coded burst-signal corresponding to said second- and third SAWs, respectively,
    said sideward IDTs receiving said coded burst-signal simultaneously, and exciting fourth- and fifth SAWs on said piezoelectric substrate, respectively,
    said central IDT receiving said fourth- and fifth SAWs simultaneously,
    said envelope detecting device causing a coded digital-signal corresponding to said third- and fourth coded patterns, respectively, said pulse generator generating an output digital-signal, which is based on said coded digital-signal and is equivalent to said message digital-signal, said mixer delivering said output digital-signal into said second electric power-lines.

3. A coupler for digital communication on electric power-lines as defined in claim 2, wherein said first- and second coded IDTs have a different number of interdigital electrode pairs from said third- and fourth coded IDTs.

4. A coupler for digital communication on electric power-lines as defined in claim 2, wherein said third- and fourth coded patterns are in reverse to said first- and second coded patterns, respectively.

5. A coupler for digital communication on electric power-lines as defined in claim 2, wherein said first-, second-, third-, and fourth coded patterns are changed in accordance with a designated time region, respectively.

6. A coupler for digital communication on electric power-lines as defined in claim 2, wherein a propagation direction of said first SAW is orthogonal to that of said second- and third SAWs.

7. A coupler for digital communication on electric power-lines as defined in claim 2, wherein a propagation direction of said second- and third SAWs is orthogonal to that of said fourth- and fifth SAWs.

8. A coupler for digital communication on electric power-lines as defined in claim 2, wherein said piezoelectric substrate is made of a piezoelectric ceramic, and the polarization axis thereof is parallel to the thickness direction thereof.

9. A coupler for digital communication on electric power-lines as defined in claim 2 further comprising a bipolar-pulse generator in place of said pulse generator.

* * * * *